United States Patent
Shoham et al.

(10) Patent No.: US 12,174,585 B2
(45) Date of Patent: Dec. 24, 2024

(54) SYSTEM AND METHOD FOR REAL-TIME IN-SITU HOLOGRAPHIC MICROSCOPY

(71) Applicant: NEW YORK UNIVERSITY, New York, NY (US)

(72) Inventors: Shy Shoham, Brooklyn, NY (US); Gilad Lerman, Jerusalem (IL)

(73) Assignee: New York University, New York, NY (US)

(*) Notice: Subject to any disclaimer, the term of this patent is extended or adjusted under 35 U.S.C. 154(b) by 860 days.

(21) Appl. No.: 17/351,637

(22) Filed: Jun. 18, 2021

(65) Prior Publication Data
US 2021/0397129 A1  Dec. 23, 2021

Related U.S. Application Data

(60) Provisional application No. 63/041,472, filed on Jun. 19, 2020.

(51) Int. Cl.
| | |
|---|---|
| G03H 1/08 | (2006.01) |
| G02B 27/28 | (2006.01) |
| G03B 21/20 | (2006.01) |
| G03H 1/00 | (2006.01) |

(52) U.S. Cl.
CPC ......... *G03H 1/0866* (2013.01); *G02B 27/283* (2013.01); *G03B 21/2073* (2013.01); *G03H 2001/005* (2013.01); *G03H 2222/12* (2013.01); *G03H 2223/22* (2013.01)

(58) Field of Classification Search
None
See application file for complete search history.

(56) References Cited

U.S. PATENT DOCUMENTS

| | | | |
|---|---|---|---|
| 11,287,444 B2 * | 3/2022 | Lal | G01Q 60/42 |
| 2006/0012785 A1 * | 1/2006 | Funk | G01J 3/10 |
| | | | 356/301 |
| 2009/0027747 A1 * | 1/2009 | Lee | G02B 21/32 |
| | | | 359/30 |
| 2010/0262212 A1 * | 10/2010 | Shoham | A61N 5/06 |
| | | | 607/88 |
| 2018/0329191 A1 * | 11/2018 | Cheng | G01R 31/311 |
| 2021/0063964 A1 * | 3/2021 | Marshel | G03H 1/2294 |

OTHER PUBLICATIONS

Accanto, N. et al. Multiplexed temporally focused light shaping for high-resolution multi-cell targeting. Optica 5, 1478-1491, doi:10.1364/OPTICA.5.001478 (2018).

(Continued)

*Primary Examiner* — Robert E. Tallman
(74) *Attorney, Agent, or Firm* — Riverside Law LLP

(57) ABSTRACT

A holographic imaging system comprises an imaging light source defining an imaging light path, an active light source defining an active light path directed at a target, and a polarizer configured to modify the polarization of the active light path. The system further comprises a polarization beam splitter positioned in the active light path and the imaging light path, configured to separate the active light path and the imaging light path, and a photodetector positioned at a terminus of the active light path. The photodetector is configured to measure a reflection of the active light source. A method of holographic imaging is also described.

14 Claims, 5 Drawing Sheets

(56) References Cited

OTHER PUBLICATIONS

Allegra Mascaro, A. L. et al. Label-free near-infrared reflectance microscopy as a complimentary tool for two-photon fluorescence brain imaging. Biomed. Opt. Express 6, 4483-4492, doi:10.1364/BOE.6.004483 (2015).

Baker, C. A. et al., Cellular resolution circuit mapping with temporal-focused excitation of soma-targeted channelrhodopsin. Elife 5, doi:10.7554/eLife.14193 (2016).

Carrillo-Reid, L. et al., Imprinting and recalling cortical ensembles. Science 353, 691-694, doi:10.1126/science.aaf7560 (2016).

Dal Maschio, M. et al., Linking Neurons to Network Function and Behavior by Two-Photon Holographic Optogenetics and Volumetric Imaging. Neuron 94, 774-789 e775, doi:10.1016/j.neuron.2017.04.034 (2017).

Dana, H. et al., Numerical evaluation of temporal focusing characteristics in transparent and scattering media. Opt. Express 19, 4937-4948, doi:10.1364/OE.19.004937 (2011).

Dana, H. et al., Rapid volumetric temporal focusing multiphoton microscopy of neural activity: theory, image processing, and experimental realization. vol. 8226 PWB (SPIE, 2012).

Emiliani, V., et al., All-Optical Interrogation of Neural Circuits. J Neurosci 35, 13917-13926, doi:10.1523/JNEUROSCI.2916-15.2015 (2015).

Forli, A. et al. Two-Photon Bidirectional Control and Imaging of Neuronal Excitability with High Spatial Resolution In Vivo. Cell Rep 22, 3087-3098, doi:10.1016/j.celrep.2018.02.063 (2018).

Galiñanes, G. L. et al. Optical alignment device for two-photon microscopy. Biomed. Opt. Express 9, 3624-3639, doi:10.1364/BOE.9.003624 (2018).

Gerchberg, R. W. et al., Practical Algorithm for Determination of Phase from Image and Diffraction Plane Pictures. Optik 35, 237−+ (1972).

Golan, L., et al., Design and characteristics of holographic neural photo-stimulation systems. J Neural Eng 6, 066004, doi:10.1088/1741-2560/6/6/066004 (2009).

Helmchen, F. et al., Deep tissue two-photon microscopy. Nature Methods 2, 932, doi:10.1038/nmeth818 (2005).

Lerman, G. M. et al., Precise optical probing of perceptual detection. bioRxiv, 456764, doi:10.1101/456764 (2018).

Mardinly, A. R. et al. Precise multimodal optical control of neural ensemble activity. Nat Neurosci 21, 881-893, doi:10.1038/s41593-018-0139-8 (2018).

Nikolenko, V. et al. SLM Microscopy: Scanless Two-Photon Imaging and Photostimulation with Spatial Light Modulators. Front Neural Circuits 2, 5, doi:10.3389/neuro.04.005.2008 (2008).

Packer, A. M. et al., Simultaneous all-optical manipulation and recording of neural circuit activity with cellular resolution in vivo. Nat Methods 12, 140-146, doi:10.1038/nmeth.3217 (2015).

Papagiakoumou, E. et al., Functional patterned multiphoton excitation deep inside scattering tissue. Nature Photonics 7, 274, doi:10.1038/nphoton.2013.9 (2013).

Papagiakoumou, E., et al., Patterned two-photon illumination by spatiotemporal shaping of ultrashort pulses. Opt. Express 16, 22039-22047, doi:10.1364/OE.16.022039 (2008).

Pégard, N. C. et al. Three-dimensional scanless holographic optogenetics with temporal focusing (3D-SHOT). Nature Communications 8, 1228, doi:10.1038/s41467-017-01031-3 (2017).

Picot, A. et al. Temperature Rise under Two-Photon Optogenetic Brain Stimulation. Cell Rep 24, 1243-1253 e1245, doi:10.1016/j.celrep.2018.06.119 (2018).

Pnevmatikakis, E. A. et al., NoRMCorre: An online algorithm for piecewise rigid motion correction of calcium imaging data. J Neurosci Meth 291, 83-94, doi:10.1016/j.jneumeth.2017.07.031 (2017).

Pologruto, T. A. et al., ScanImage: flexible software for operating laser scanning microscopes. Biomed Eng Online 2, 13, doi:10.1186/1475-925X-2-13 (2003).

Shemesh, O. A. et al., Temporally precise single-cell-resolution optogenetics. Nat Neurosci 20, 1796-1806, doi:10.1038/s41593-017-0018-8 (2017).

Theer, P. et al., On the fundamental imaging-depth limit in two-photon microscopy. J Opt Soc Am A Opt Image Sci Vis 23, 3139-3149 (2006).

Wang, M. et al. Comparing the effective attenuation lengths for long wavelength in vivo imaging of the mouse brain. Biomed Opt Express 9, 3534-3543, doi:10.1364/BOE.9.003534 (2018).

Wang, T. et al., Quantitative Comparison of Two-photon and Three-photon Activity Imaging of GCaMP6s-labeled Neurons in vivo in the Mouse Brain, in Optics in the Life Sciences Congress. BrM4B.4 (Optical Society of America).

Xia, F. et al. In vivo label-free confocal imaging of the deep mouse brain with long-wavelength illumination. Biomed. Opt. Express 9, 6545-6555, doi:10.1364/BOE.9.006545 (2018).

Yang, W., et al., Simultaneous two-photon imaging and two-photon optogenetics of cortical circuits in three dimensions. Elife 7, doi:10.7554/eLife.32671 (2018).

* cited by examiner

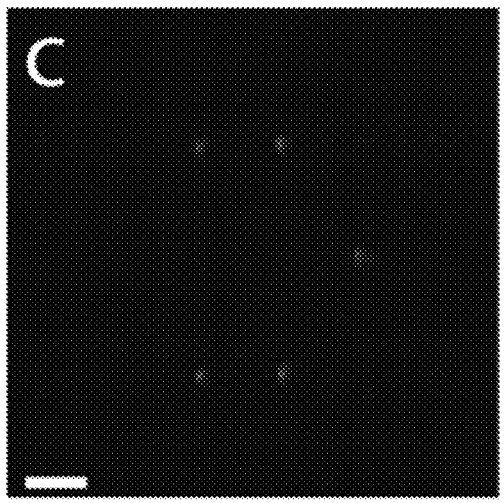
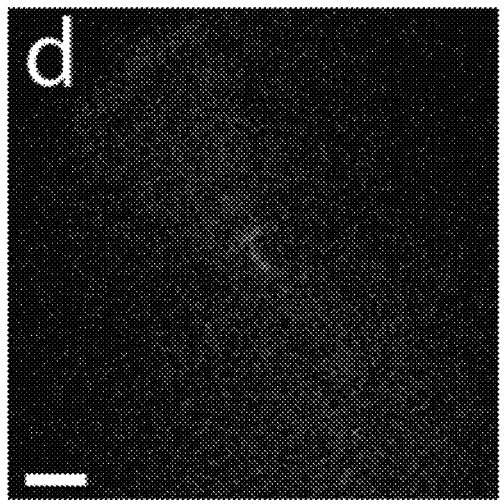
Fig. 1C  Fig. 1D
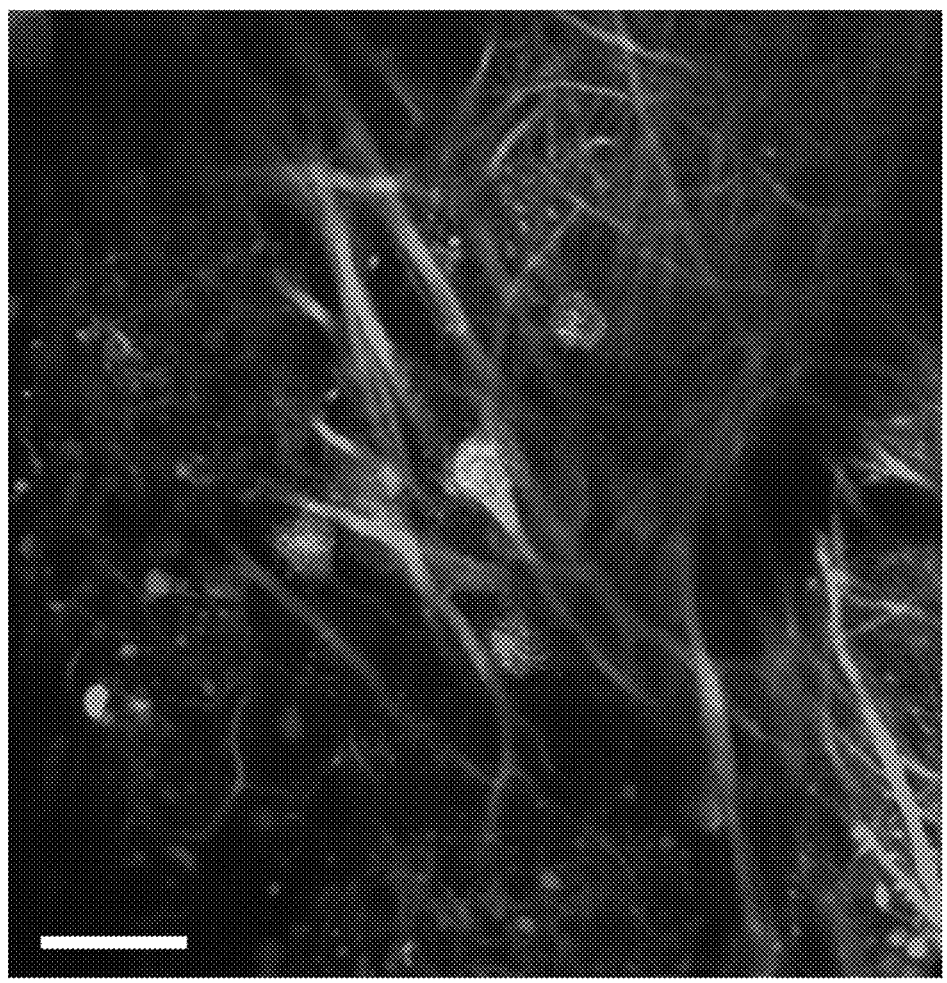
Fig. 2

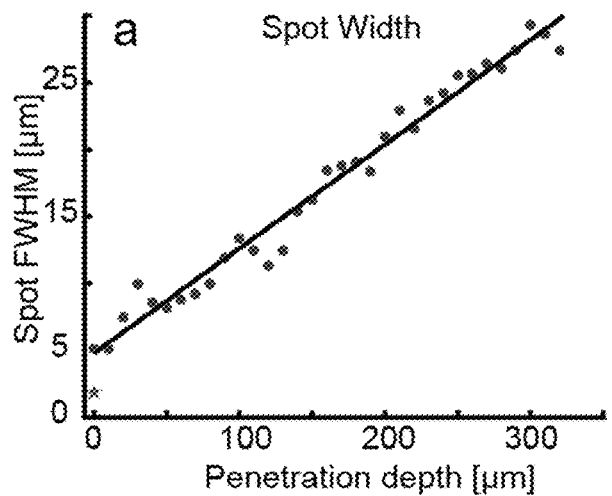
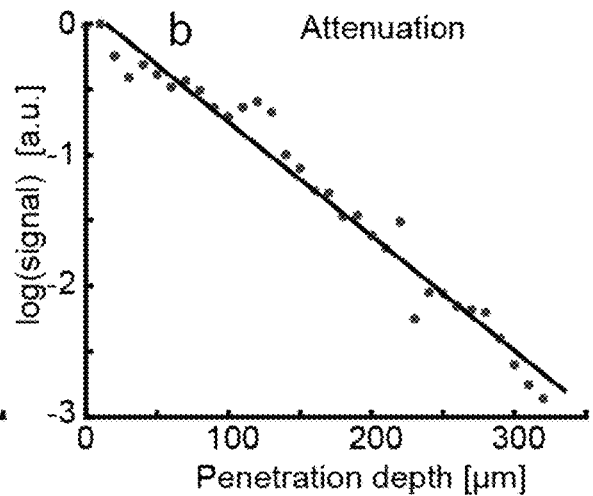
Fig. 5A  Fig. 5B
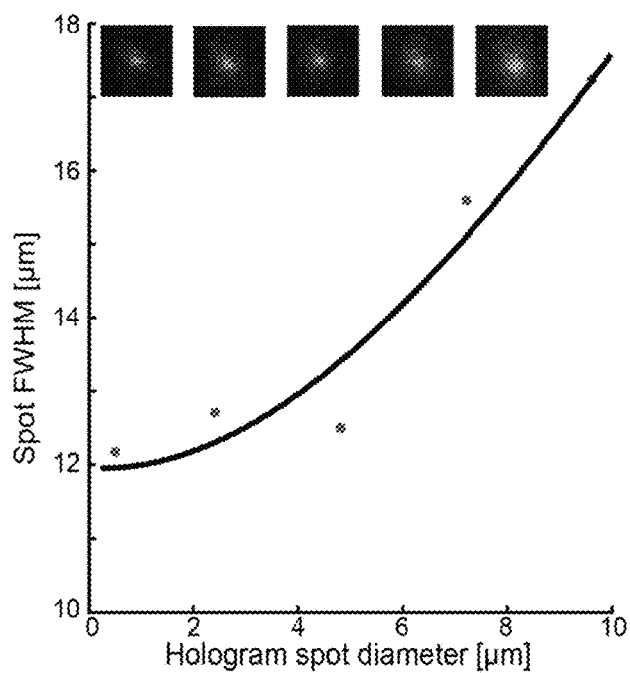
Fig. 6

SYSTEM AND METHOD FOR REAL-TIME IN-SITU HOLOGRAPHIC MICROSCOPY

CROSS-REFERENCE TO RELATED APPLICATIONS

This application claims priority to U.S. Provisional Patent Application No. 63/041,472, filed on Jun. 19, 2020, incorporated herein by reference in its entirety

STATEMENT REGARDING FEDERALLY SPONSORED RESEARCH OR DEVELOPMENT

This invention was made with government support under grant numbers 5U01NS090498 and 5U19NS107464 awarded by the National Institutes of Health. The government has certain rights in the invention.

BACKGROUND OF THE INVENTION

Computer generated holograms (CGH) is a method of digitally generating holographic interference patterns. It is used in many applications where shaping of light into arbitrary shapes in three dimensions (3D) is necessary, such as display applications (free-space and heads-up), optogenetic stimulation of specific neurons in the brain, micromachining inside transparent materials and optical tweezers. During propagation inside the material, these patterns undergo severe distortion, due to scattering and/or aberrations, that leads to a discrepancy between the desired and actual light distribution. Existing applications rely on calibrations that are done outside of the material and do not take into account the distortions induced by the material. However, despite its importance, real-time observation/measurements of the induced distortions and the fidelity of these light patterns are yet to be demonstrated.

Two-photon optogenetic stimulation is the leading method to date for deep, precise, fast and non-invasive cellular excitation. This method includes a number of holographic wavefront-shaping and spatiotemporal focusing techniques, for example spatial light modulators (SLMs), are used to generate 3D light patterns and deliver them to specific cells with millisecond resolution. These patterns are composed of cell soma sized "spots", which are focused up to a few hundred microns deep into the brain to stimulate specific, pre-chosen neurons with millisecond temporal precision. During propagation in the brain, these patterns undergo severe distortion, mainly due to scattering, that leads to a discrepancy between the desired and actual light distribution.

A few factors influence the intensity distribution at the focal plane and cause a discrepancy between the desired and the actual result. As these light patterns propagate in brain tissue towards the focal plane, they experience extensive scattering and are subject to complex, unpredictable distortions that must be compensated for. In the contexts of wavefront-shaped holographic spatiotemporal focusing applications, prediction of the final light distribution becomes even harder due to the difficulty of combining wave-based and scattering-related calculations during hologram generation. A related concern regarding hologram generation is that the intensity of the generated spots is generally not uniform due to, among other factors, position-dependent diffraction efficiency of the SLM and optical aberrations and needs to be corrected with a relevant spatial correction function. These concerns are usually treated either theoretically, based on elaborate computational effort, or experimentally based on direct measurements using brain slices. During the design of a new holographic optogenetic targeting technique, correction functions are implemented in the process of hologram generation and the method is calibrated and validated experimentally. Nevertheless, the nature and complexity of these experiments prevent them from being carried out prior to every stimulation experiment and a method for in situ measurement of holographically generated light pattern fidelity is yet to be demonstrated. The user, therefore, must rely on the robustness and stable calibration of the targeting method despite the natural variations in experiments and time.

Therefore, there is a need in the art for a method for real-time evaluation of holographic light patterns, permitting measurement of the dimensions and positions of the pattern relative to intended dimensions and positions without changing the optical axis, in order to make appropriate adjustments to output characteristics. The present invention satisfies this need.

SUMMARY OF THE INVENTION

In one aspect, a holographic imaging system comprises an imaging light source defining an imaging light path, an active light source defining an active light path directed at a target, a polarizer configured to modify the polarization of the active light path, a polarization beam splitter positioned in the active light path and the imaging light path, configured to separate the active light path and the imaging light path, and a photodetector positioned at a terminus of the active light path, configured to measure a reflection of the active light source. In one embodiment, the holographic imaging system further comprises an electrically tunable lens in the active light path, configured to focus the reflection of the active light source on the photodetector. In one embodiment, the polarizer is at least one quarter waveplate. In one embodiment, the holographic imaging system further comprises a controller configured to measure at least one parameter of the reflection of the active light source and make adjustments to at least one parameter of light emitted from the active light source.

In one embodiment, the polarizer is at least one quarter waveplate coverslip or cover-glass. In one embodiment, the active light source is a 2P optogenetic stimulation laser. In one embodiment, the holographic imaging system further comprises a pinhole in the active light path configured to reflect scattered light. In one embodiment, the active light source is a micromachining laser. In one embodiment, the holographic imaging system further comprises a second photodetector positioned at a terminus of the imaging light path, configured to measure a reflection of the imaging light source.

In another aspect, a method of holographic imaging comprises projecting an active light source toward a target, projecting an imaging light source toward the target, modifying the polarization of the active light source, merging active light from the active light source with imaging light from the imaging light source so that the active light and the imaging light strike the target coaxially, separating active light reflected from the target from imaging light reflected from the target using a polarization beam splitter, and measuring the active light reflected from the target with a photodetector.

In one embodiment, the polarization of the active light is rotated by 90 degrees. In one embodiment, the method further comprises the steps of calculating at least one parameter from the measured active light, and adjusting at least one parameter of the active light based on the calculated parameter. In one embodiment, the parameter of the active light comprises adding a periodic phase pattern to the active light source. In one embodiment, the parameter of the measured active light is selected from the group consisting of position, dimensions, and intensity distribution.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 1C and FIG. 1D are sample images taken by an experimental setup of the disclosed invention;

FIG. 2 is an exemplary merged image produced by the disclosed descan system;

FIG. 5A and FIG. 5B are graphs of experimental results; and

FIG. 6 is a graph of experimental results.

DETAILED DESCRIPTION

Figure 1A:
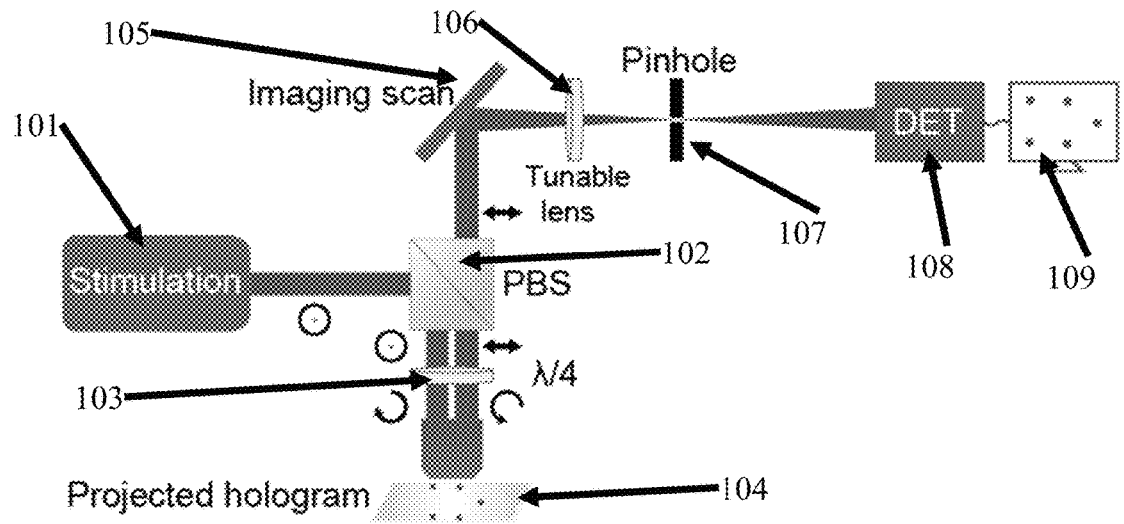
FIG. 1A is a schematic of a descan system.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, Visual Basic, or MATLAB. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

The present invention relates to a system (in certain instances referred to herein as "HOCUS") and method for real-time evaluation of holographic light patterns in situ, which permits measurements of both material and wave propagation properties. The disclosed system and method is based on confocally descanning the reflection of holographic light patterns, for example light patterns focused into the brains of awake mice. The method is accomplished in part by decoupling the holographic projection path and the observation path, without introducing a parallax. This method enables real-time correction of the positions of holographic spots and can be used to optimize the generated hologram to compensate for tissue induced distortions, thereby improving the reproducibility of 2P holographic stimulation experiments.

Imaging by descanned light reflection takes advantage of a scanning excitation mechanism already present in a typical experimental apparatus, using it in the opposite direction to gain additional information about the sample or material. Photons emitted from the sample or material, such as ballistic reflections from the excitation source or fluorescence, are imaged with a confocal detection system. Previous demonstrations have used this method for long-wavelength reflectance imaging, in combination with a fluorescence imaging setup, using the reflections of fluorescence excitation light. In the disclosed system, reflection of an active light source, for example a 2P optogenetic stimulation laser, is used to get additional information about its position, dimensions and intensity distribution. The reflection may also be used to determine material properties and to compensate for material induced distortions, thereby improving the reproducibility and accuracy in a variety of applications using CGH.

As discussed herein, an "active light source" may refer to a stimulation light source, for example a stimulation laser used in optogenetic stimulation, a holographic projection source, a laser engraving light source, a micromachining light source, or any other light source whose principal purpose is not mere illumination of a target for imaging purposes. An objective of the disclosed system is to observe the position and characteristics of the light distribution emitted by the active light source at some plane of interest (e.g. a focal plane) in order to validate the active light source emitter and make appropriate adjustments to the active light source emitter and/or the light emitted by the active light source emitter, for example modifying the phase or amplitude of the light along the light path in order to change the observed characteristics. An active light path refers to the optical path defined by the active light source. Similarly, an "imaging light source" refers herein to a light whose principal purpose is to illuminate a target for imaging purposes. An imaging light path refers to the optical path defined by the imaging light source.

With reference now to FIG. 1A, a schematic of the descan system combining reflected stimulation light 101 with confocal imaging is shown with the polarization state at each stage. "DET" denotes a detector 108.

In one embodiment, a stimulation source 101, for example a photostimulation source, projects light through a PBS 102 which then passes through a QWP 103 before being projected as a hologram on a surface 104. An image/reflection passes back through QWP 103 and PBS 102 and is scanned by imaging scan 105, while some or all of the light is reflected through tunable lens 106 and pinhole 107, into detector 108, which is communicatively connected to a computing device 109 for reading the detected image data.

Figure 1B:
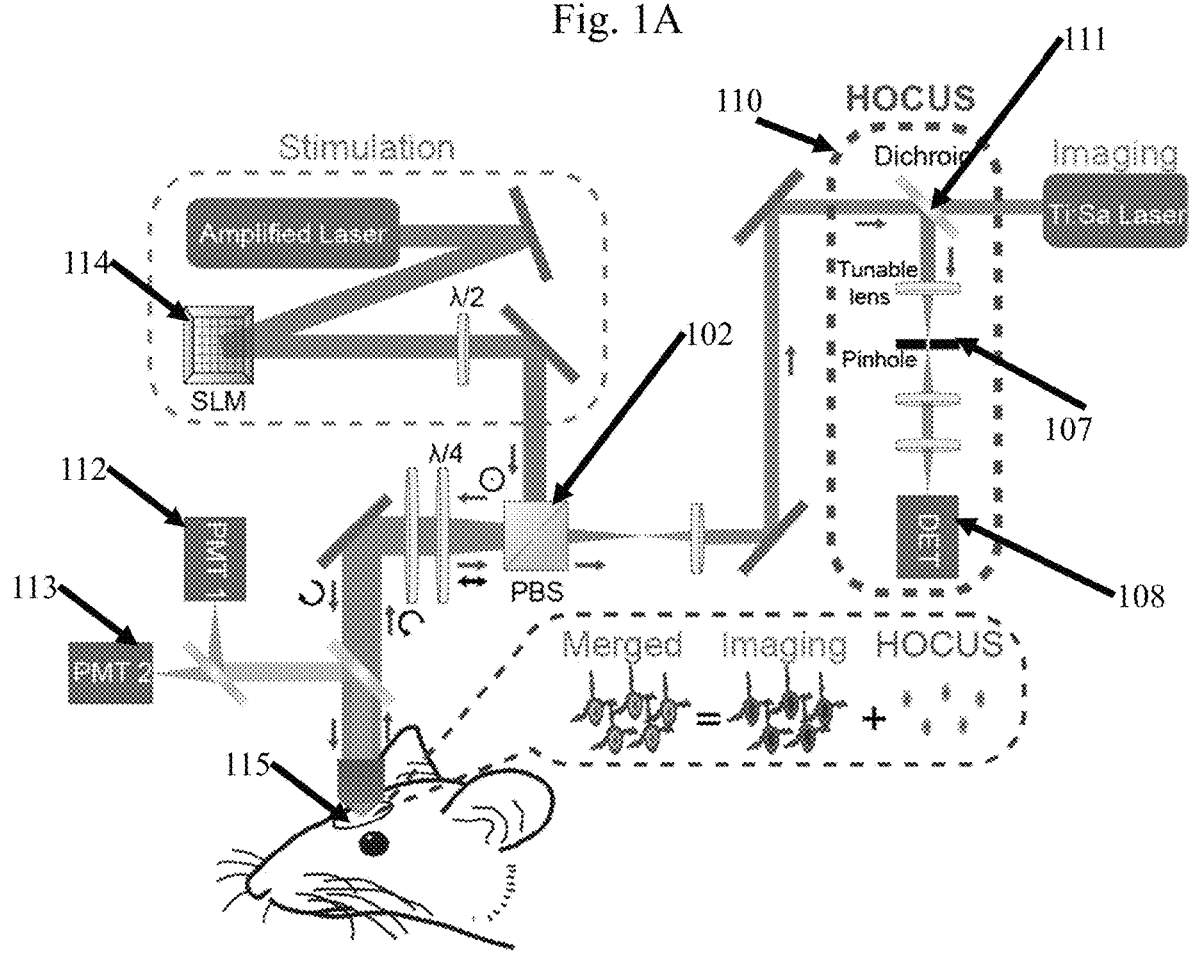
FIG. 1B is a schematic of an experimental setup.

FIG. 1B is an Experimental setup. The 2P imaging path is combined with the holographic 2P photostimulation path for in vivo experiments in head-fixed, behaving mice. The reflected stimulation light passes through the PBS, 102, is descanned by the mirrors and reflected by the dichroic mirror 111 through the pinhole 107 onto the detector 108. "PBS" 102 denotes a polarizing beam splitter; PMT1 112 and PMT2 113 are photomultiplier tubes; SLM denotes a spatial light modulator 114. FIG. 1C is a HOCUS measurement of a 5-spot stimulation pattern reflected from a glass sample. FIG. 1D is a sample of a spot inside a mouse's implanted glass cranial window showing the ability of HOCUS to measure optical aberrations. All scale bars in FIG. 1C and FIG. 1D are 25 µm.

The optical configuration of the disclosed system is shown in FIG. 1B, and is based on the concept of confocally descanning the stimulation light's reflection from the tissue 115, thereby reconstructing its shape and position. The disclosed HOCUS detection module 110 is added onto an existing all-optical imaging and stimulation system and can, in principle, be added to any microscope with 2P optogenetic stimulation capabilities. In order to separate the reflection of the stimulation light from reflected imaging light, a combination of a polarization beam splitter (PBS, 102) and a quarter waveplate (QWP) is used ensuring that back-reflected stimulation light will pass through the PBS along the imaging light path, while the reflected imaging beam will be deflected away from this path. The reflected stimulation light is descanned by the imaging scan system and then hits an electrically tunable lens (ETL, 106) that focuses it onto a pinhole 107 followed by a detector 108. The ETL 106 is used to fine tune the focused beam on the pinhole 107 without the need to physically move the lens and allows to scan the imaging plane when 3D mapping the stimulation pattern.

As understood herein, a PBS 102 is a structure, for example a prism constructed from a birefringent material whose refractive index depends on the polarization of the incoming light. Such materials may therefore be configured to split an incoming beam of light having components of different polarization into two or more separate beams of light having substantially different polarizations from one another. One example of a PBS is a Wollaston prism. A PBS used in a system of the present invention may have any suitable shape, including but not limited to a cube or a rectangular prism. The dimensions of a PBS used with the present invention may vary based on the application. A PBS may be uniaxial, biaxial, or may comprise components of both.

ETLs as described herein include any adjustable geometry lens, for example a lens comprising one or more shaping elements forming an optical fluid cavity therebetween, that can be actuated to shape the optical fluid cavity in order to change the contained fluid's characteristics as a lens. In some embodiments, the shaping elements comprise a polymer. An ETL may comprise one shaping element on one side of the optical fluid cavity and a rigid element on the other side of the lens, so that one side of the optical fluid lens substantially retains its shape while the other side is adjustable. Adjustments may be applied kinetically, for example by pressing down on the outside of a ring in order to force more fluid into the center, or electronically, for example using a piezoelectric material. In some embodiments, lens geometry may be adjusted by pumping optical fluid into or out of a sealed cavity, thereby changing the shape of the cavity by applying additional pressure.

A QWP may be configured to convert linearly polarized light to circularly polarized light or vice-versa. A QWP may also be configured to rotate the polarization of incoming light by an angle, for example 90 degrees. In one embodiment, the QWP rotates the polarization of the incoming light when the light double passes through it. Controlling the polarization of the stimulation light and the imaging light allows for the separation of the two prior to the one or more detectors, which in turn allows for more effective control of the stimulation light, as described below.

FIG. 1C and FIG. 1D show proof-of-concept examples of HOCUS microscopic imaging of light patterns back-reflected from physical samples: The first is a 5-spot stimulation pattern projected onto a glass cover slide (FIG. 1C) positioned at the focal plane. The reflection from the glass is much stronger than the reflection from the brain tissue and there is no distortion due to scattering. The second is a spot imaged inside the mouse's implanted glass cranial window (FIG. 1D). As can be seen, the spot is diffused and aberrated and as a result the spot size increases while its intensity decreases. Because HOCUS can image these spot size changes and intensities, it can be used to measure the tissue scattering manifested as attenuation length and in principle also to compensate for optical aberrations by serving as the feedback in a closed loop process of iteratively reducing the spot size imaged by HOCUS.

FIG. 2 shows an exemplary HOCUS image including a pattern of 4 light spots projected onto a brain, 120 μm deep in the olfactory bulb, and positioned on 4 respective neurons, merging the imaging channel showing GCaMP6s (green) and the HOCUS channel showing the reflection of the stimulation pattern (red). The scale bar in FIG. 2 is 25 μm.

Figure 3:
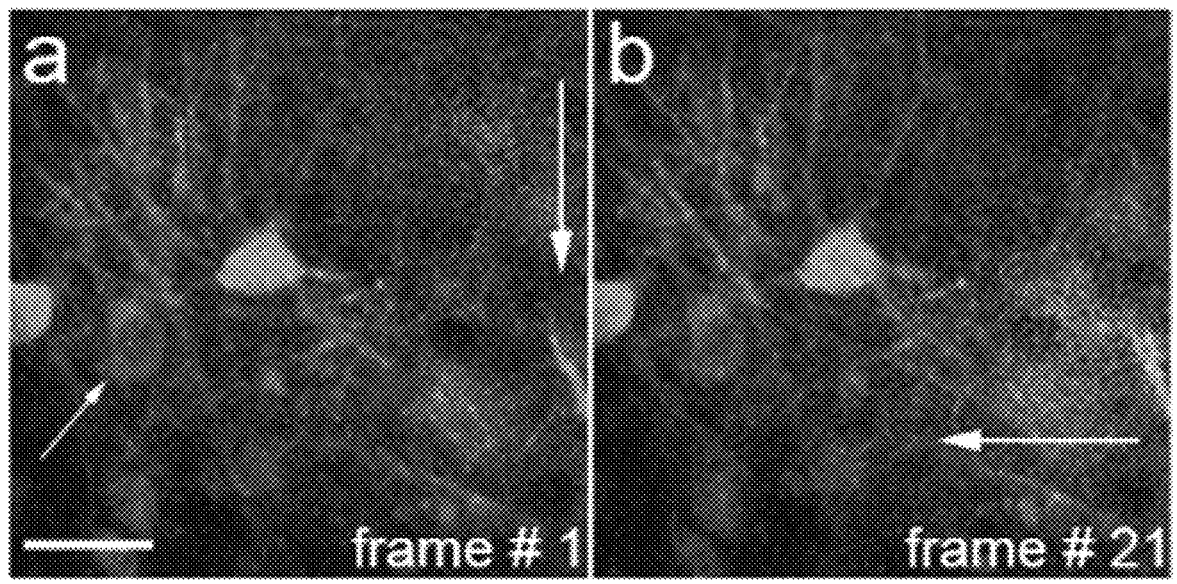
FIG. 3 is a set of images depicting movement of a spot towards an intended target cell.
Figure 3:
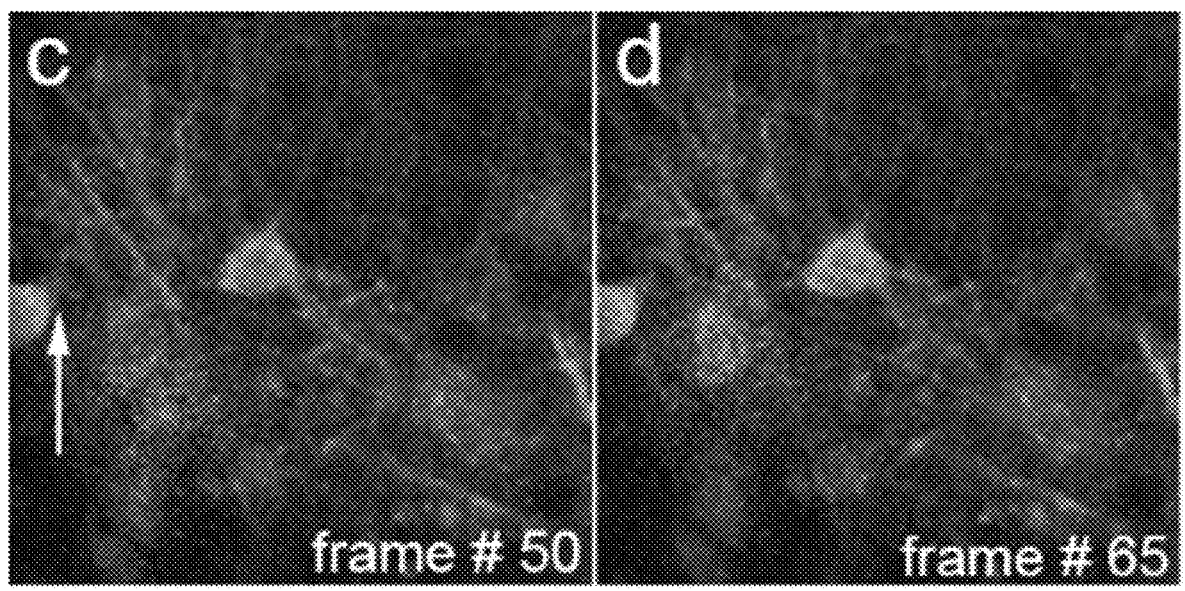

The exact position of individual light spots of a hologram is a crucial factor in the success potential of every cellular-resolution optogenetic experiment. A deviation of a few microns can lead to activation of unwanted cells and to a misinterpretation of the neural circuit being investigated. Often, holograms are misplaced due to brain movements. These movements can occur after the hologram was already calculated, just before an experiment is about to start. To compensate for these movements, one can use a motion correction algorithm that tries to iteratively bring the FOV back to its original position by comparing it to a reference image. These algorithms greatly depend on the current state of the FOV—if the imaging has degraded due to bleaching of the fluorescent molecule or brain plasticity, it will affect the accuracy of the algorithm leading to a misplaced FOV or to a non-converging iteration process. Dealing with brain movements is another advantage of HOCUS as it allows real-time imaging of the position of the spots while still using the fluorescence channel to image the cells. While imaging the FOV, the hologram can be changed in real-time by adding a periodic phase pattern to the current hologram on the SLM. This periodic phase acts as a diffraction grating by moving the spots in a desirable distance and direction. This method is immediate as it does not require the recalculation of a new hologram from scratch, and the results of adding the additional grating phases are instantly seen with HOCUS allowing a user to "walk" the spot step-by-step to cover the cell. FIG. 3 shows a process of repositioning a spot on a cell by adding phases of gratings to its original hologram. The diagonal arrow on panel A shows the target cell and the straight arrows in panels B-D show the direction of spot movement. The scale bar in FIG. 3 is 20 μm. This method enables quick corrections and fine tuning of the hologram applied just before a stimulation experiment is carried out. It is anticipated that SNR improvement will allow real-time motion correction during experiments.

In some embodiments, a system of the present invention comprises a computing device or a controller configured to receive the measured image data from the one or more photodetectors of the invention and perform real-time image analysis steps on the received image data. The controller may then make appropriate adjustments to one or more parameters of the light emitted from the active light source, for example a stimulation laser, in order to cause the light emitted from the active light source to be closer to an intended position, intensity, or distribution. In some embodiments, the controller may adjust one or more parameters of the active light source by introducing or removing phases of gratings to the active light path.

HOCUS subsystems can be added to most conventional all-optical imaging and stimulation systems and we anticipate it will be routinely used in such experiments. The optical design was inspired by the back-scatter descanning arms added to multi-photon microscopes for observing intrinsic contrast signals from axonal structures, and can be easily modified to also allow their observation.

Additional improvement can be achieved by removing the background noise arising from residual reflections from the PBS by using a PBS with no residual reflection to unwanted directions, or by adding an additional polarizer to the HOCUS path before the ETL. Also, the QWP can be replaced by a QWP cover-slip to further minimize the background reflection signal. Estimating the 2P signal based on HOCUS measurements requires some caution, since due to scattering, photons at the outskirt of the spot arrive at the focal plane with different times than photons at the center of the spot. This temporal discrepancy translates into a reduced 2P signal and therefore the actual 2P spot size for stimulation would be smaller than just the square of the HOCUS signal.

To summarize, in order to reduce the discrepancy between the desired and actual 2P holographic light pattern caused mainly by tissue induced distortions, we have developed a real-time method for evaluating the dimension, position and intensity distribution of holographic patterns in situ. Based on confocally descanning the reflection of the stimulation light pattern the stimulation pattern can be reconstructed, its similarity to the desired pattern is assessed and its position easily corrected. An additional need for direct measurement of light distribution in the brain is for estimating the temperature rise due to stimulation. The thermal effects caused by stimulation are usually neglected but are becoming more dominant with the increase of the number of stimulated cells and stimulation duration. Mapping light distribution in the brain can help in estimating the temperature and design better targeting methods for dealing with dangerous thermal effects. The HOCUS depth-imaging attenuation estimates agree nicely with independently measured tissue scattering coefficients. An additional application of this method includes use as a ground truth feedback for the iterative calculation of holograms, generating a closed loop that will help optimize the holograms used for stimulation. The new method adds an additional level of certainty to 2P holographic stimulation experiments as it verifies the holograms are as desired thereby improving their reproducibility and efficiency.

One aspect of the invention includes the addition of a HOCUS system to an all-optical imaging and stimulation system. One exemplary embodiment of the system combines an imaging arm with a 920 nm fs laser illumination source (Spectra X3), and a photostimulation arm with a 1028 nm fs amplified laser source (Light Conversion Pharos). The holograms were calculated using custom MATLAB software that makes use of a modified Gerchberg-Saxton algorithm and were loaded on the SLM (HSPDM512-920-1110, Meadowlark Optics, optimized for 1064 nm, 7.68*7.68 mm active area, 512×512 pixels).

Both stimulation and imaging beams are projected onto the brain and are back-reflected through the objective and along their original combined path. In order to separate the reflection of the stimulation light from reflected imaging light, a PBS (Thorlabs, PBS253) is used to combine the imaging and stimulation arms, each linearly polarized orthogonally to the other arm. A QWP (Thorlabs, AQWP10M-980) is added after the PBS so that the light reflected from the brain double-passes through the QWP and its polarization direction will be rotated by 90 degrees. This ensures that back-reflected stimulation light will pass through the PBS along the imaging light path, while the reflected imaging beam will be deflected away from this path. After the reflected stimulation light is descanned by the galvo-resonant mirror pair, it is reflected by a dichroic mirror (Semrock, FF989-SDi01-25×36) and separated from the incoming imaging light. The reflected stimulation light beam next hits an ETL (Optotune, EL-10-30-TC) that focuses it onto a 10 μm diameter pinhole (Thorlabs, P10S). The beam is re-collimated and refocused onto a detector (Thorlabs, APD410C) by a pair of lenses (Thorlabs, f=50.0 mm, LA1131-C). This detector is an affordable, small form-factor solution for the near infrared regime with high sensitivity to capture the small signal of the light reflected from the brain. The signal from the detector is amplified (DHPCA-100, Femto), digitized and captured using ScanImage (Vidrio Technologies). Subsequent image processing was limited to subtracting a constant noise pattern that originates from residual reflections of the incoming stimulation light on the PBS, and to weak image smoothing.

Another aspect of the invention relates to a co-registration system for the stimulation field of view (FOV), the imaging FOV, and the HOCUS FOV. Such coregistration is beneficial if a HOCUS system is to be used for real-time cellular targeting. For this coregistration, a calibration pattern was burned onto a fluorescent plate (Ted Pella, INC.) by the photostimulation system. The plate was then imaged by the 2P imaging system and the calibration pattern was used for the registration of the two systems. In the next step, the fluorescent plate was removed and a mirror was placed at the focal plane of the objective lens. The reflection of the calibration pattern was imaged by HOCUS and was used to register HOCUS FOV to the other FOVs.

Figure 4:
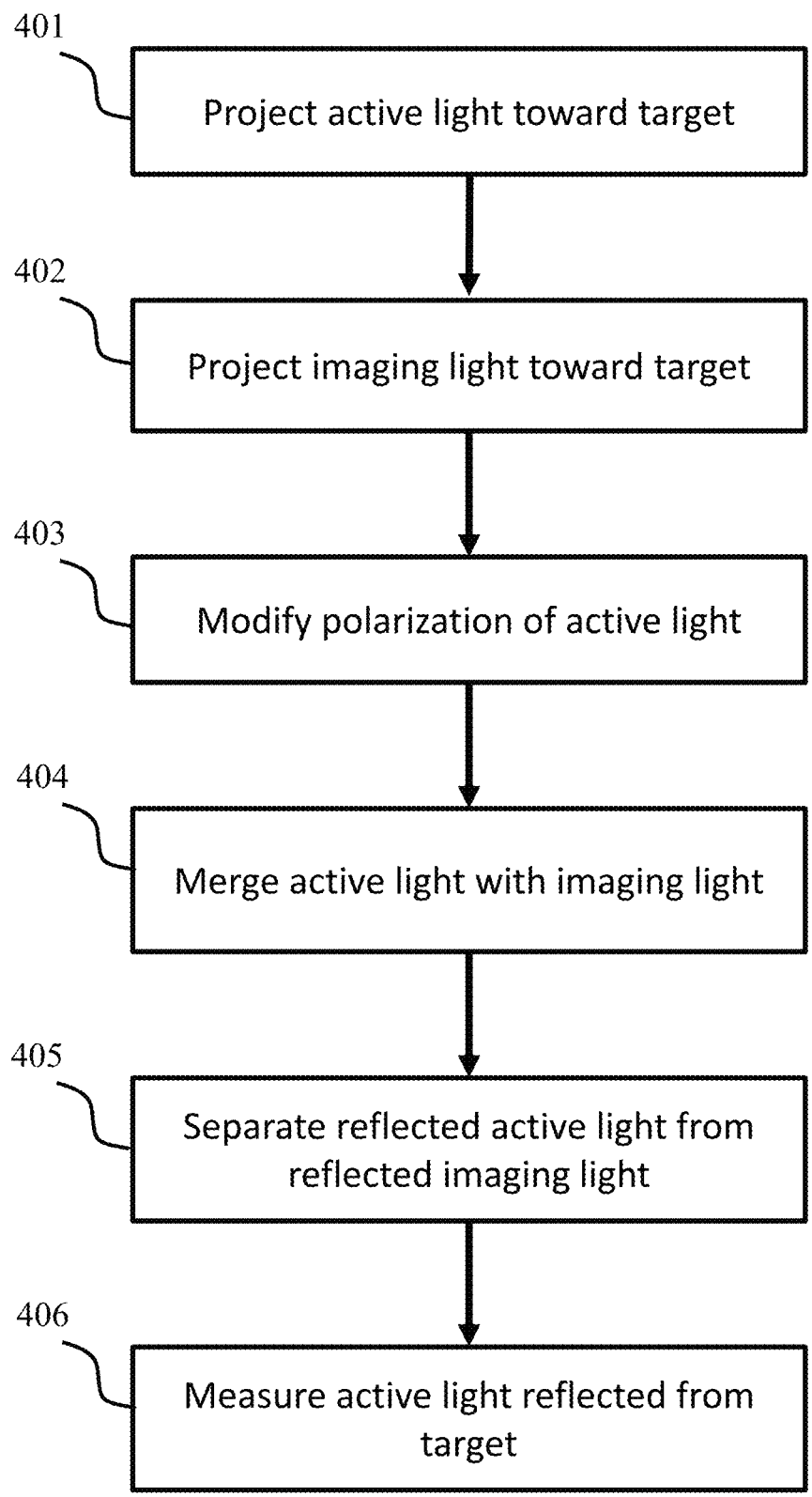

With reference to FIG. 4, a disclosed method of holographic imaging is shown. The method includes the steps of projecting an active light source toward a target in step 401, projecting an imaging light source toward the target in step 402, modifying the polarization of the active light source in step 403, merging active light from the active light source with imaging light from the imaging light source so that the active light and the imaging light strike the target coaxially in step 404, separating active light reflected from the target from imaging light reflected from the target using a polarization beam splitter in step 405, and measuring the active light reflected from the target with a photodetector in step 406.

Although methods and devices of the present invention are presented herein in examples relating to optical stimulation of tissue, including observation of stimulation patterns and adjustment of a stimulation source based on the measured stimulation pattern, it is understood that the methods and devices disclosed herein may be used in a variety of other applications, including for example micromachinery or holographic projections. In one embodiment, a HOCUS device may monitor and adjust an optical source, for example a laser light source, according to observed laser light patterns on a material being cut or melted by the laser. For example, in certain instances the device and method described herein improves the efficiency and accuracy of material processing by light during micromachining or microprinting applications. In one embodiment, the device can be used to in consumer displays. In one example, a HOCUS device may monitor a laser making cuts to a cornea, and make adjustments to the laser based on the reflected cutting pattern in relation to a desired cutting pattern.

Similarly, in holographic projection, a HOCUS device may monitor and adjust a holographic projection source according to an observed holographic projection.

Experimental Examples

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the exemplary embodiments of the present invention, and are not to be construed as limiting in any way the remainder of the disclosure.

To explore the in vivo performance of HOCUS, we injected the olfactory bulb of mice with a 1:1 mixture of viral vectors for the calcium indicator GcaMP6s and the red-shifted opsin ChrimsonR, which respectively enable the imaging of the cell's activity and its photostimulation (AAV5-Syn-GcaMP6s-WPRE-SV40 and AAV5-Syn-ChrimsonR-tdTomato, UPENN vector core). Following injection, a cranial window was implanted, replacing a circular piece of skull by a glass coverslip (3 mm diameter, Warner Instruments) that was secured in place using a mix of self-curing resin (Orthojet, Lang Dental) and cyanoacrylate glue (Krazy Glue). We used the green and red fluorescence signals to choose cells that express both GcaMP6s and ChrimsonR, and then generate a pattern of patches that will cover these cells. Next, we projected the spots onto the brain and used HOCUS to image the reflection of these spots to estimate their shape and position. FIG. 2, referenced above, shows a HOCUS image generated during the experiment. The power levels used for the HOCUS imaging are kept low (<3 mw/cell) so that the stimulation pattern will not damage the cells even after a few minutes of exposure. We used galvo mirrors for the scan with a frame rate of 1 frame per second which can be further increased by improving the signal to noise (SNR) ratio of the system. After the position and shape of the stimulation pattern was verified by HOCUS and corrected if needed, the stimulation power was increased, and the experiment began.

Although the scattering of near-infrared light in brain tissues is greatly reduced compared to that of visible light, it is still an important factor that needs to be considered when attempting 2P stimulation in deep layers. Scattering-related effects increase the spot size and reduce the intensity over the targeted cells, effects that combine to compromise the excitation efficiency and specificity. To characterize the tissue-scattering effect we generated and projected a hologram of a single (nearly) diffraction-limited light spot, which was z-scanned by moving the objective across different depths in the olfactory bulb. At each depth, we imaged both GCaMP6s fluorescence and the reflected stimulation light distribution with HOCUS. Spot dimensions were estimated using a fit to a 2D Lorentzian function at each depth in 10 μm increments (FIG. 5A) and were found to increase linearly for deeper depth penetration to >25 μm widths (Full Width Half Maximum, abbreviated herein as FWHM). Imaging was stopped at 320 μm (below the mitral cell layer), where the GcaMP6s signal was too weak to clearly discern cells, while the (strongly scattered) HOCUS signal was still visible. In contrast, the spot dimensions on the upper side of the cranial glass window is just 2 μm (FWHM, red asterisk), while its width at the lower side of the window at the brain's surface (z=0) was 5 μm. The measurement is a convolution of the point spread function of the HOCUS system and the actual spot, and it is well known that the transcranial glass window can introduce aberrations to the imaging and stimulation beams, degrading their performance. Interestingly, HOCUS directly measures these aberrations and allows their correction by, for example, adjusting the objective's angle relative to the cover glass.

HOCUS can provide not only valuable information about the position and shape of the spots, but also about their relative intensities and the intensity uniformity within each spot, which can be used to optimize the 2P signal for stimulation. FIG. 5B is a graph of the attenuation of the maximum intensity of the spot (calculated as the average of 25 pixels in the center of the beam) as a function of penetration depth. The intensity decays exponentially with a decay length of 229 μm. The center of the beam is comprised mainly by ballistic photons arriving at the focal plane with an attenuation length that is dependent on both scattering and absorption. At 1028 nm, absorption is negligible compared to scattering and so the attenuation length is dominated by scattering. As we use a pinhole to block the scattered light, the photons that reached the detector are ballistic photons that have travelled twice the penetration depth. From this measurement we found an attenuation length of 229 μm at a wavelength of 1028 nm, which agrees well with previous measurements of attenuation lengths of 152-158 μm at 920 nm and 305-319 μm at 1300 nm.

We next generated patch holograms of different sizes and projected them at a depth of 100 μm in the olfactory bulb. The HOCUS images of these spots are shown along the top of FIG. 6, and their estimated dimensions (FWHM) are shown in the graph of FIG. 6, as a function of hologram spot diameter. At small values of the patch diameter, the measured spot's dimensions slowly increase as a function of the hologram dimension, but for larger values the measured spot's dimensions increases much faster. As was shown in FIG. 5A, for every depth there is a natural scattering-related PSF kernel, which measures ~13 μm FWHM at z=100 μm. The HOCUS measurement is a convolution between the PSF kernel and the actual spot. Therefore, the resulting width is given by $\sqrt{c^2+ax^2}$ where c is the FWHM of the PSF kernel, x is the hologram spot diameter and a is a multiplicative constant. At small values of hologram spot diameter, the constant PSF kernel is dominant and the change in measured spot width is slow. As the hologram spot diameter increases, it becomes more dominant and approaching a linear dependency between the change of hologram spot diameter and the change in measured spot size.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

REFERENCES

The below references are all incorporated herein by reference in their entireties:

Golan, L., et al., Design and characteristics of holographic neural photo-stimulation systems. J Neural Eng 6, 066004, doi:10.1088/1741-2560/6/6/066004 (2009).

Emiliani, V., et al., All-Optical Interrogation of Neural Circuits. J Neurosci 35, 13917-13926, doi:10.1523/JNEUROSCI.2916-15.2015 (2015).

Baker, C. A. et al., Cellular resolution circuit mapping with temporal-focused excitation of soma-targeted channelrhodopsin. Elife 5, doi:10.7554/eLife.14193 (2016).

Dal Maschio, M. et al., Linking Neurons to Network Function and Behavior by Two-Photon Holographic Optogenetics and Volumetric Imaging. Neuron 94, 774-789 e775, doi:10.1016/j.neuron.2017.04.034 (2017).

Shemesh, O. A. et al., Temporally precise single-cell-resolution optogenetics. Nat Neurosci 20, 1796-1806, doi:10.1038/s41593-017-0018-8 (2017).

Yang, W., et al., Simultaneous two-photon imaging and two-photon optogenetics of cortical circuits in three dimensions. Elife 7, doi:10.7554/eLife.32671 (2018).

Forli, A. et al. Two-Photon Bidirectional Control and Imaging of Neuronal Excitability with High Spatial Resolution In Vivo. Cell Rep 22, 3087-3098, doi:10.1016/j.celrep.2018.02.063 (2018).

Mardinly, A. R. et al. Precise multimodal optical control of neural ensemble activity. Nat Neurosci 21, 881-893, doi:10.1038/s41593-018-0139-8 (2018).

Nikolenko, V. et al. SLM Microscopy: Scanless Two-Photon Imaging and Photostimulation with Spatial Light Modulators. Front Neural Circuits 2, 5, doi:10.3389/neuro.04.005.2008 (2008).

Packer, A. M. et al., Simultaneous all-optical manipulation and recording of neural circuit activity with cellular resolution in vivo. Nat Methods 12, 140-146, doi:10.1038/nmeth.3217 (2015).

Pegard, N. C. et al. Three-dimensional scanless holographic optogenetics with temporal focusing (3D-SHOT). Nature Communications 8, 1228, doi:10.1038/s41467-017-01031-3 (2017).

Papagiakoumou, E., et al., Patterned two-photon illumination by spatiotemporal shaping of ultrashort pulses. Opt. Express 16, 22039-22047, doi:10.1364/OE16.022039 (2008).

Carrillo-Reid, L. et al., Imprinting and recalling cortical ensembles. Science 353, 691-694, doi:10.1126/science.aaf7560 (2016).

Dana, H. et al., Numerical evaluation of temporal focusing characteristics in transparent and scattering media. Opt. Express 19, 4937-4948, doi:10.1364/OE19.004937 (2011).

Dana, H. et al., Rapid volumetric temporal focusing multiphoton microscopy of neural activity: theory, image processing, and experimental realization. Vol. 8226 PWB (SPIE, 2012).

Papagiakoumou, E. et al., Functional patterned multiphoton excitation deep inside scattering tissue. Nature Photonics 7, 274, doi:10.1038/nphoton.2013.9 (2013).

Allegra Mascaro, A. L. et al. Label-free near-infrared reflectance microscopy as a complimentary tool for two-photon fluorescence brain imaging. Biomed. Opt. Express 6, 4483-4492, doi:10.1364/BOE.6.004483 (2015).

Xia, F. et al. In vivo label-free confocal imaging of the deep mouse brain with long-wavelength illumination. Biomed. Opt. Express 9, 6545-6555, doi:10.1364/BOE.9.006545 (2018).

Lerman, G. M. et al., Precise optical probing of perceptual detection. bioRxiv, 456764, doi:10.1101/456764 (2018).

Helmchen, F. et al., Deep tissue two-photon microscopy. Nature Methods 2, 932, doi:10.1038/nmeth818 (2005).

Theer, P. et al., On the fundamental imaging-depth limit in two-photon microscopy. J Opt Soc Am A Opt Image Sci Vis 23, 3139-3149 (2006).

Wang, M. et al. Comparing the effective attenuation lengths for long wavelength in vivo imaging of the mouse brain. Biomed Opt Express 9, 3534-3543, doi:10.1364/BOE.9.003534 (2018).

Galifianes, G. L. et al. Optical alignment device for two-photon microscopy. Biomed. Opt. Express 9, 3624-3639, doi:10.1364/BOE.9.003624 (2018).

Wang, T. et al., in Optics in the Life Sciences Congress. BrM4B.4 (Optical Society of America). Pnevmatikakis, E. A. et al., NoRMCorre: An online algorithm for piecewise rigid motion correction of calcium imaging data. J Neurosci Meth 291, 83-94, doi:10.1016/j.jneumeth.2017.07.031 (2017).

Picot, A. et al. Temperature Rise under Two-Photon Optogenetic Brain Stimulation. Cell Rep 24, 1243-1253 e1245, doi:10.1016/j.celrep.2018.06.119 (2018).

Accanto, N. et al. Multiplexed temporally focused light shaping for high-resolution multi-cell targeting. Optica 5, 1478-1491, doi:10.1364/OPTICA.5.001478 (2018).

Gerchberg, R. W. et al., Practical Algorithm for Determination of Phase from Image and Diffraction Plane Pictures. Optik 35, 237-+(1972).

Pologruto, T. A. et al., ScanImage: flexible software for operating laser scanning microscopes. Biomed Eng Online 2, 13, doi:10.1186/1475-925X-2-13 (2003).

What is claimed is:

1. A holographic imaging system, comprising:
   an imaging light source defining an imaging light path;
   an active light source defining an active light path directed at a target;
   a polarizer configured to modify the polarization of the active light path;
   a polarization beam splitter positioned in the active light path and the imaging light path, configured to separate the active light path and the imaging light path; and
   a photodetector positioned at a terminus of the active light path, configured to measure a reflection of the active light source.

2. The holographic imaging system of claim 1, further comprising an electrically tunable lens in the active light path, configured to focus the reflection of the active light source on the photodetector.

3. The holographic imaging system of claim 1, wherein the polarizer is at least one quarter waveplate.

4. The holographic imaging system of claim 1, further comprising a controller configured to measure at least one parameter of the reflection of the active light source and make adjustments to at least one parameter of the light emitted from the active light source.

5. The holographic imaging system of claim 1, wherein the polarizer is at least one quarter waveplate coverslip or cover-glass.

6. The holographic imaging system of claim 1, wherein the active light source is a 2P optogenetic stimulation laser.

7. The holographic imaging system of claim 1, further comprising a pinhole in the active light path configured to reflect scattered light.

8. The holographic imaging system of claim 1, wherein the active light source is a micromachining laser.

9. The holographic imaging system of claim 1, further comprising a second photodetector positioned at a terminus of the imaging light path, configured to measure a reflection of the imaging light source.

10. A method of holographic imaging, comprising:
    projecting an active light source toward a target;
    projecting an imaging light source toward the target;
    modifying the polarization of the active light source;
    merging active light from the active light source with imaging light from the imaging light source so that the active light and the imaging light strike the target coaxially;
    separating active light reflected from the target from imaging light reflected from the target using a polarization beam splitter; and
    measuring the active light reflected from the target with a photodetector.

11. The method of claim 10, wherein the polarization of the active light is rotated by 90 degrees.

12. The method of claim 10, further comprising the steps of:
    calculating at least one parameter from the measured active light; and
    adjusting at least one parameter of the active light based on the calculated parameter.

13. The method of claim 10, wherein the parameter of the active light source comprises adding a periodic phase pattern to the active light.

14. The method of claim 10, wherein the parameter of the measured active light is selected from the group consisting of position, dimensions, and intensity distribution.

* * * * *